(12) United States Patent
Chen

(10) Patent No.: US 10,930,133 B1
(45) Date of Patent: Feb. 23, 2021

(54) BIDIRECTIONAL TRACKING SYSTEM AND BIDIRECTIONAL TRACKING METHOD

(71) Applicant: Cha Hu Lian Technology Inc., Taipei (TW)

(72) Inventor: Ann-Pin Chen, Taipei (TW)

(73) Assignee: CHA HU LIAN TECHNOLOGY INC., Taipei (TW)

( * ) Notice: Subject to any disclaimer, the term of this patent is extended or adjusted under 35 U.S.C. 154(b) by 0 days.

(21) Appl. No.: 16/577,116

(22) Filed: Sep. 20, 2019

(51) Int. Cl.
*G08B 21/24* (2006.01)
*G01S 11/06* (2006.01)
*G01S 13/74* (2006.01)

(52) U.S. Cl.
CPC .............. *G08B 21/24* (2013.01); *G01S 11/06* (2013.01); *G01S 13/74* (2013.01)

(58) Field of Classification Search
CPC ......... G08B 21/24; G01S 11/06; G01S 13/74; H04W 64/00
See application file for complete search history.

(56) References Cited

U.S. PATENT DOCUMENTS

| | | | |
|---|---|---|---|
| 8,554,142 B2* | 10/2013 | Hoover | H04W 76/14 455/41.2 |
| 9,942,849 B1* | 4/2018 | Hariharan | H04W 8/005 |
| 2010/0015919 A1* | 1/2010 | Tian | H04W 8/005 455/41.2 |
| 2018/0099643 A1* | 4/2018 | Golsch | B60R 25/2018 |
| 2019/0135229 A1* | 5/2019 | Ledvina | H04W 4/023 |

* cited by examiner

*Primary Examiner* — Thomas D Alunkal
(74) *Attorney, Agent, or Firm* — Guice Patents PLLC

(57) ABSTRACT

A bidirectional tracking system including a wearable device and a tracking tag, the wearable device being for a user to wear or carry, and the tracking tag being for attaching to a valuable personal object, the wearable device including a first UWB module, a first Bluetooth module and a first alarm module; the tracking tag including a second UWB module; and the valuable personal object including a tracking application program; where the valuable personal object is configured to perform a Bluetooth ranging procedure with the first Bluetooth module to obtain a first distance, when the first distance is greater than a first warning distance, the first UWB module performs a UWB ranging procedure with the second UWB module to obtain a second distance, and when the second distance is greater than a second warning distance, the first alarm module sends a warning message.

9 Claims, 4 Drawing Sheets

BIDIRECTIONAL TRACKING SYSTEM AND BIDIRECTIONAL TRACKING METHOD

BACKGROUND OF THE INVENTION

Field of the Invention

The present invention relates to a bidirectional tracking system and a bidirectional tracking method applicable in a pre-designated short range.

Description of the Related Art

In today's life, smart mobile devices have become an indispensable tool for people to take public transportation, pay for shopping, query maps, browse social networking sites or play video games. When a user accidentally forgot a smart mobile device somewhere, it will not only make him feel inconvenient, but also may cause problems with security or monetary losses. Therefore, it has become an important issue on how to prevent the loss of smart mobile devices.

To solve the problems mentioned above, there is a need in the art to provide a novel tracking system for smart mobile devices that can work in a pre-designated short range to proactively prevent the loss of the smart mobile devices.

SUMMARY OF THE INVENTION

One objective of the present invention is to provide a bidirectional tracking system that can effectively prevent a wearable device or a valuable personal object from being lost in a proactively preventive manner with low power consumption or can facilitate a user to find a wearable device or a valuable personal object.

Another objective of the present invention is to provide a bidirectional tracking method that can effectively prevent a wearable device or a valuable personal object from being lost in a proactively preventive manner with low power consumption or can facilitate a user to find a wearable device or a valuable personal object.

To attain the above objectives, a bidirectional tracking system is proposed, which includes a wearable device and a tracking tag, the wearable device being for a user to wear or carry, the tracking tag being for attaching to a valuable personal object, and the bidirectional tracking system being characterized in that:

the wearable device includes a first UWB module, a first Bluetooth module and a first alarm module;

the tracking tag includes a second UWB module; and the valuable personal object includes a tracking application program;

wherein at least one selected from a group consisting of the tracking tag and the valuable personal object has a second Bluetooth module, and the second Bluetooth module is configured to perform a Bluetooth ranging procedure with the first Bluetooth module to obtain a first distance, when the first distance is greater than a first warning distance, the first UWB module performs a UWB ranging procedure with the second UWB module to obtain a second distance, and when the second distance is greater than a second warning distance, the first alarm module sends a warning message.

In one embodiment, the Bluetooth ranging procedure obtains the first distance according to a Bluetooth signal reception strength, and the UWB ranging procedure obtains the second distance by using a TOF procedure.

For possible embodiments, the warning message includes one or more forms selected from a group consisting of a sound, a light signal, a number, a text and an image.

In one embodiment, both the wearable device and the tracking tag have an ID code.

For possible embodiments, at least one selected from a group consisting of the first alarm module and the valuable personal object will issue a proximity indication message when a UWB communication link status between the first UWB module and the second UWB module changes from unconnected to connected.

For possible embodiments, the wearable device can be in different form factors and can be a smart watch, a smart bracelet, a smart necklace or a smart keychain.

In one embodiment, the wearable device includes a first human-machine interface module.

In one embodiment, the tracking tag includes a second human-machine interface module.

To attain the above objectives, the present invention further provides a bidirectional tracking method for application between a wearable device and a valuable personal object incorporating a tracking tag, the bidirectional tracking method including the following steps:

performing a first ID code verification procedure between the wearable device and the tracking tag and a second ID code verification procedure between the wearable device and the valuable personal object, wherein the tracking tag is attached with the valuable personal object;

performing a Bluetooth ranging procedure between the wearable device and the valuable personal object or between the wearable device and the tracking tag to obtain a first distance, and recording a first comparison result of the first distance and a first warning distance in the wearable device or the valuable personal object; and performing a UWB ranging procedure between the wearable device and the tracking tag to obtain a second distance when the comparison result indicates that the first distance is greater than the first warning distance, recording a second comparison result of the second distance and a second warning distance in the wearable device or the tracking tag, and making at least one selected from a group consisting of the wearable device, the tracking tag and the valuable personal object generate an alarm message when the second comparison result indicates that the second distance is greater than the second warning distance.

To attain the above objectives, the present invention further provides a bidirectional tracking method for application between a wearable device and a valuable personal object incorporating a tracking tag, the bidirectional tracking method including the following steps:

performing a first ID code verification procedure between the wearable device and the tracking tag and a second ID code verification procedure between the wearable device and the valuable personal object, wherein the tracking tag is attached with the valuable personal object; and when a UWB communication link status between the tracking tag and the wearable device changes from unconnected to connected, at least one selected from a group of the wearable device, the tracking tag and the valuable personal object will issue a proximity indication message.

DETAILED DESCRIPTION OF THE PREFERRED EMBODIMENTS

To make it easier for our examiner to understand the objective of the invention, its structure, innovative features, and performance, we use preferred embodiments together with the accompanying drawings for the detailed description of the invention.

The principle of the present invention is to monitor the distance between a wearable device and a valuable personal object by combining a Bluetooth ranging technology (rough precision ranging) and a ultra-wideband (UWB) ranging technology (fine precision ranging) to effectively prevent the wearable device or the valuable personal object from being lost in an proactively preventive manner with low power consumption or facilitate a user to find the wearable device or the valuable personal object.

Figure 1:
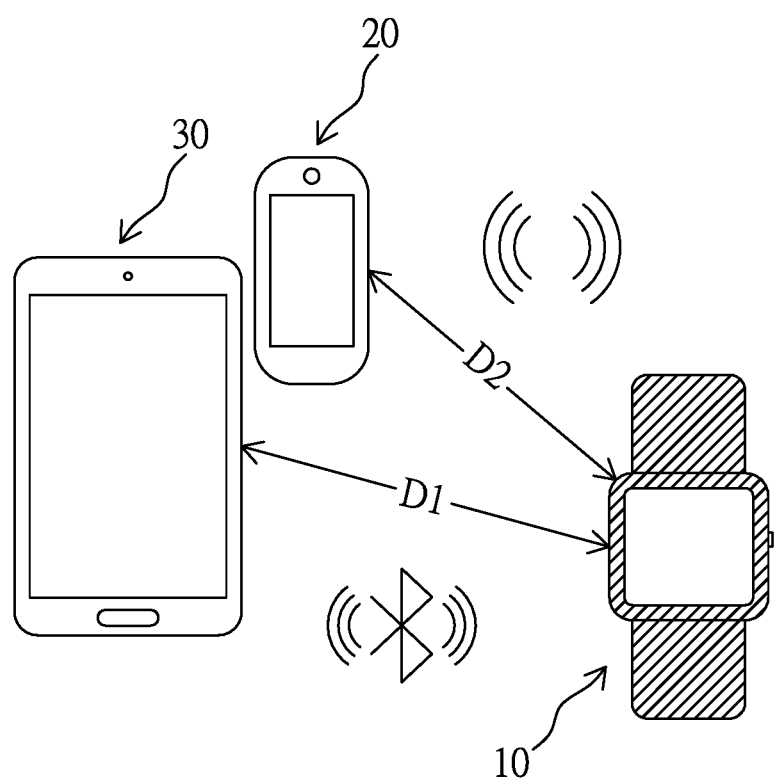
FIG. 1 illustrates an operation of the bidirectional tracking system of the present invention.
Figure 2:
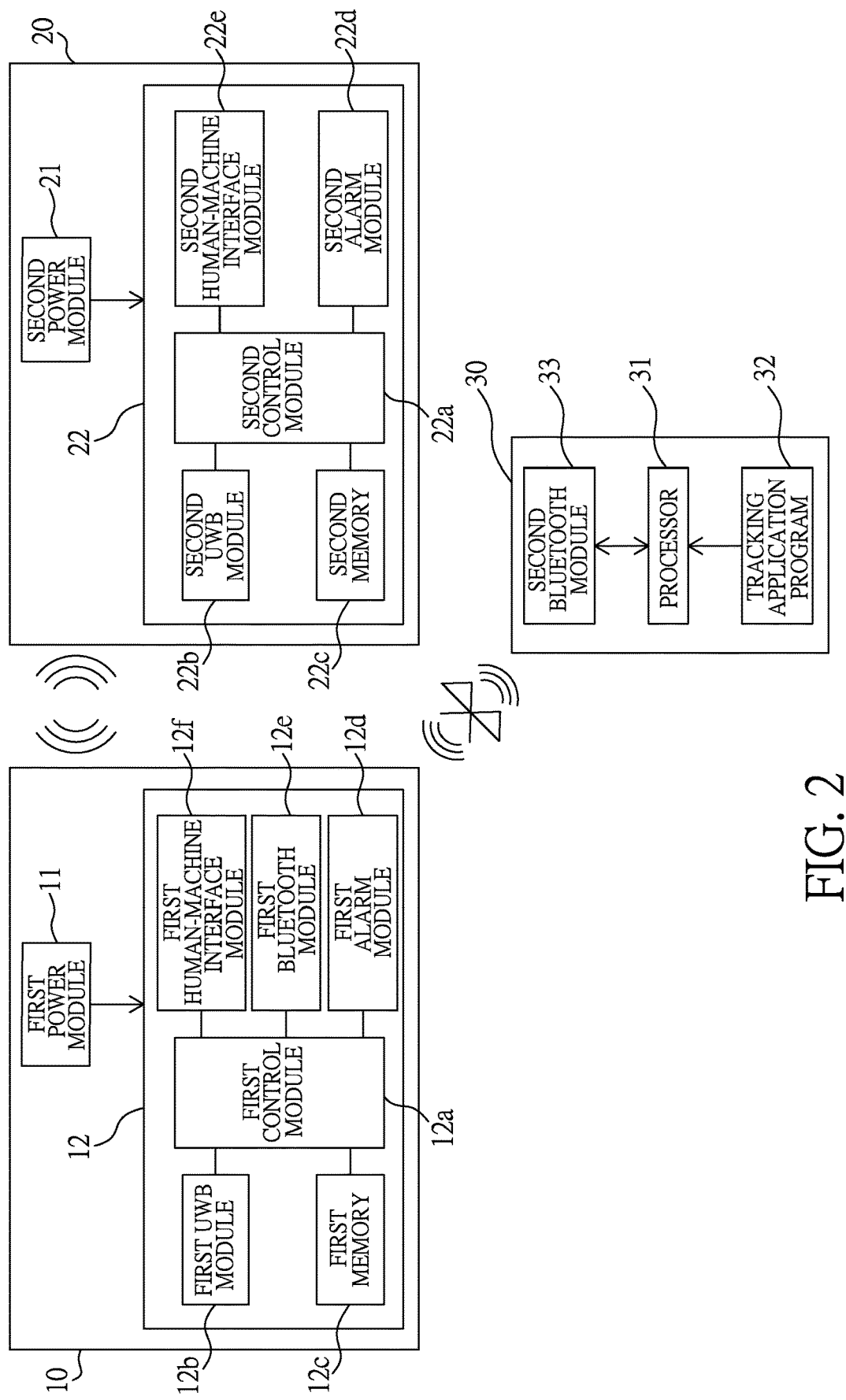
FIG. 2 illustrates a block diagram of one embodiment of the bidirectional tracking system of FIG. 1.

Please refer to FIG. 1 and FIG. 2, where FIG. 1 illustrates an operation of the bidirectional tracking system of the present invention; and FIG. 2 illustrates a block diagram of one embodiment of the bidirectional tracking system of FIG. 1. As illustrated in FIG. 1, the bidirectional tracking system includes a wearable device 10, a tracking tag 20, and a valuable personal object, which is a mobile device 30 in this embodiment and can be other personal valuables, wherein the wearable device 10 is used for a user to wear or carry, the tracking tag 20 is used for attaching to the mobile device 30, the distance (D1) between the wearable device 10 and the mobile device 30 are measured by a Bluetooth mechanism, and the distance (D2) between the wearable device 10 and the tracking tag 20 are measured by a UWB mechanism; and as shown in FIG. 2, the wearable device 10 includes a first power module 11 and a first control circuit 12, where the first power module 11 is configured to supply power to the first control circuit 12, and the first control circuit 12 includes a first control module 12a, a first UWB module 12b, a first memory 12c, a first alarm module 12d, a first Bluetooth module 12e and a first human-machine interface module 12f; the tracking tag 20 includes a second power module 21 and a second control circuit 22, where the second power module 21 is configured to supply power to the second control circuit 22, and the second control circuit 22 includes a second control module 22a, a second UWB module 22b, a second memory 22c, a second alarm module 22d and a second human-machine interface module 22e; and the mobile device 30 includes a processor 31, a tracking application program 32 and a second Bluetooth module 33.

In the wearable device 10, the first control module 12a is configured to execute a first program to control the first UWB module 12b, the first alarm module 12d, the first Bluetooth module 12e and the first human-machine interface module 12f, where the first UWB module 12b is configured to perform a UWB ranging procedure with the tracking tag 20, and the UWB ranging procedure may include a TOF (time of flight) procedure to measure the distance between the wearable device 10 and the tracking tag 20. The first alarm module 12d is configured to provide a warning message including at least one selected from a group of a sound, a light number, a text and an image; the first Bluetooth module 12e is configured to perform a Bluetooth ranging procedure with the mobile device 30, and the Bluetooth ranging procedure may include using a Bluetooth signal reception strength to measure the distance between the wearable device 10 and the mobile device 30; and the first human-machine interface module 12f is used for the user to perform a setting operation on the wearable device 10. In addition, the first memory 12c is configured to store at least one setting parameter (eg, an ID code), the first program, and an execution result of the first program.

In the tracking tag 20, the second control module 22a is configured to execute a second program to control the second UWB module 22b, the second alarm module 12d, and the second human-machine interface module 22e, where the second UWB module 22b is used to communicate with the first UWB module 12b of the wearable device 10 to perform the UWB ranging procedure; the second alarm module 22d is configured to provide an alarm message including at least one of a group consisting of sound, light, text and image; and the second human-machine interface module 22e is used for a user to perform a setting operation of the tracking tag 20. In addition, the second memory 22c is configured to store at least one setting parameter (eg, an ID code), the second program and an execution result of the second program.

In the mobile device 30, the processor 31 is configured to execute the tracking application program 32 to generate a warning distance setting menu for a user to set a first warning distance and a second warning distance, where the first warning distance defines a safe distance between the wearable device 10 and the mobile device 30, the second warning distance defines a safe distance between the wearable device 10 and the tracking tag 20; and the second Bluetooth module 33 is used to communicate with the first Bluetooth module 12e of the wearable device 10 to perform the Bluetooth ranging procedure. In addition, preferably, the tracking application program 32 is downloaded from an external device via wired or wireless internet.

After the user sets the first warning distance and the second warning distance, the mobile device 30 transmits the information of the first warning distance and the second warning distance to the wearable device 10 via the Bluetooth module 33; the wearable device 10 will store the information of the first warning distance and the second warning distance in the first memory 12c, and transmit the information of the second warning distance to the tracking tag 20 via the first UWB module 12b; and the tracking tag 20 will store the information of the second warning distance in the second memory 22c.

During the actual application, the wearable device 10 and the mobile device 30 will perform the Bluetooth ranging procedure to measure a first distance. If the first distance is greater than the first warning distance, the wearable device 10 and the tracking tag 20 will perform the UWB ranging procedure to measure a second distance, and if the second distance is greater than the second warning distance, the wearable device 10 causes the first alarm module 12d to issue a warning message to alert the user. In addition, for possible embodiments, when the first distance is greater than the first warning distance, at least one selected from a group consisting of the wearable device 10 and the mobile device 30 issues an alarm message; and when the second distance is greater than the second warning distance, the tracking tag 20 can also issue a warning message to alert the user.

Additionally, for possible embodiments, the UWB ranging procedure can be initiated by the wearable device 10 or the tracking tag 20, and the Bluetooth ranging procedure can be initiated by the wearable device 10 or the mobile device 30. In addition, the tracking tag 20 can also have a Bluetooth module to perform a Bluetooth ranging procedure with the first Bluetooth module 12e of the wearable device 10 to measure a distance, and when the distance is greater than the first warning distance, the wearable device 10 or the tracking tag 20 initiates the UWB ranging procedure.

In addition, the wearable device 10 can be a smart watch, a smart bracelet, a smart necklace or a smart keychain; and the tracking tag 20 can be a mobile device charm, a patch or other item that can be used as a mobile device accessory.

In addition, as can be seen from the above description, when a user wears the wearable device 10, the wearable device 10 can be used to monitor the distance between the user and the mobile device 30 attached with the tracking tag 20 to ensure that the mobile device 30 will not be lost; and, when a user carries the mobile device 30 attached with the tracking tag 20 but does not wear the wearable device 10, the mobile device 30 can be used to monitor the distance between the user and the wearable device 10 to ensure that the wearable device 10 will not be lost. Accordingly, the present invention can achieve a bidirectional anti-lost function between the wearable device 10 and the mobile device 30.

In addition, according to the above arrangements, the present invention can also provide a bidirectional search function. For example, a user can use the mobile device 30 attached with the tracking tag 20 to search for the wearable device 10, and when a UWB communication link status between the tracking tag 20 and the wearable device 10 changes from unconnected to connected, the mobile device 30, the wearable device 10, or both the mobile device 30 and the wearable device 10 can issue a proximity indication message to notify the user; or a user can use the wearable device 10 to search for the mobile device 30 attached with the tracking tag 20, and when a UWB communication link status between the tag 20 and the wearable device 10 changes from unconnected to connected, the wearable device 10, the mobile device 30, or both the wearable device 10 and the mobile device 30 can issue a proximity indication message to notify the user. In addition, both the bidirectional anti-lost function and the bidirectional search function can be implemented by the cooperation of the first program, the second program and the tracking application program 32, and a user can operate the warning distance setting menu, the first human-machine interface module 12f or the second human-machine interface module 22e to activate the bidirectional anti-lost function or the bidirectional search function. In addition, during the execution of the bidirectional anti-lost function or the bidirectional search function, a first ID code verification procedure can be executed between the wearable device 10 and the tracking tag 20 or a second ID code verification procedure can be executed between the wearable device 10 and the mobile device 30, so as to determine whether the wearable device 10 and the mobile device 30 are paired.

Figure 3:
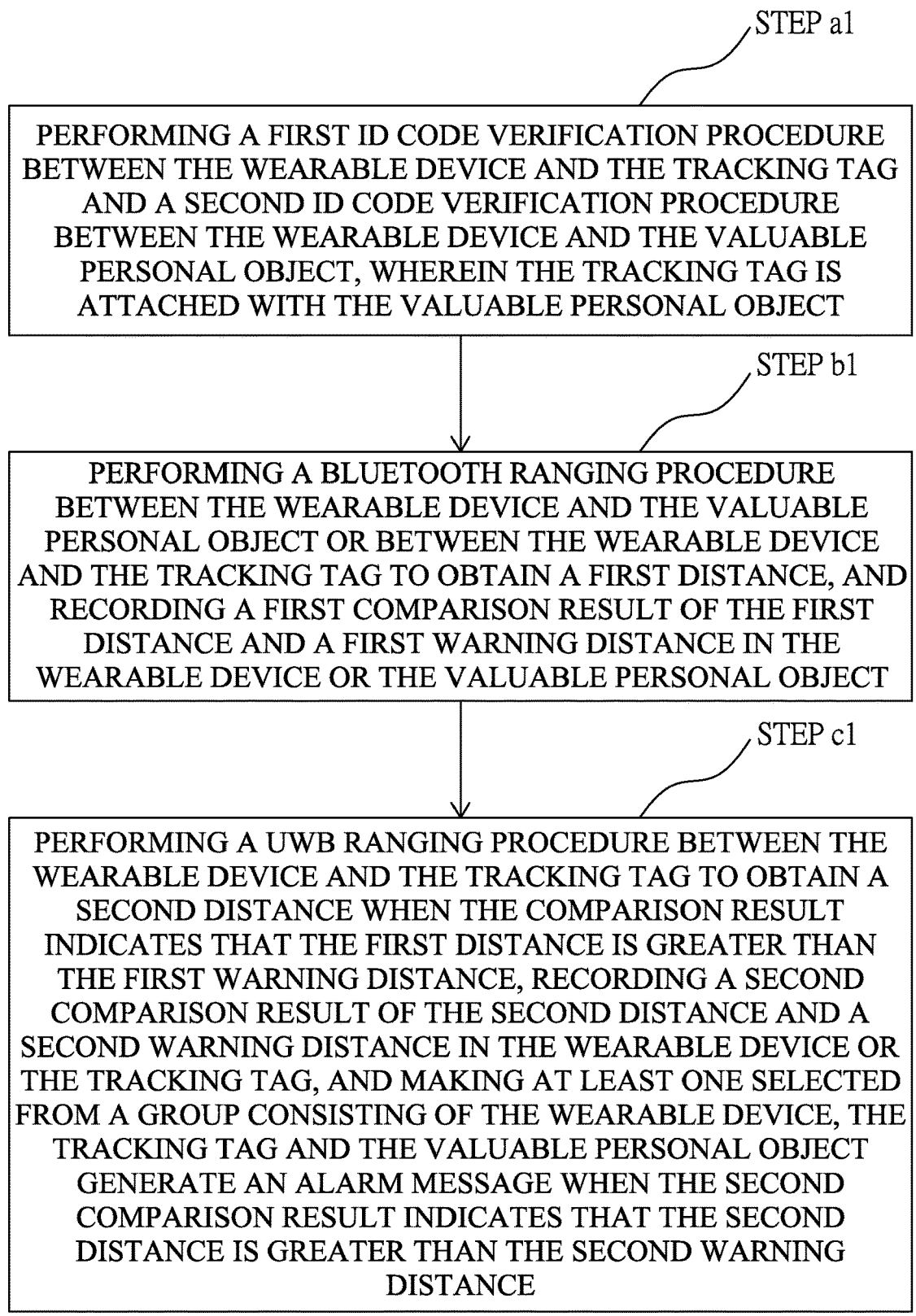
FIG. 3 illustrates a flow chart of one embodiment of a bidirectional tracking method of the present invention.

Based on the above description, the present invention further proposes a bidirectional tracking method. Please refer to FIG. 3, which illustrates a flow chart of one embodiment of a bidirectional tracking method of the present invention, where the bidirectional tracking method is applied between a wearable device and a valuable personal object attached with a tracking tag. As illustrated in FIG. 3, the bidirectional tracking method of the present invention includes the steps of: performing a first ID code verification procedure between the wearable device and the tracking tag and a second ID code verification procedure between the wearable device and the valuable personal object, wherein the tracking tag is attached with the valuable personal object (step a1); performing a Bluetooth ranging procedure between the wearable device and the valuable personal object or between the wearable device and the tracking tag to obtain a first distance, and recording a first comparison result of the first distance and a first warning distance in the wearable device or the valuable personal object (step b1); and performing a UWB ranging procedure between the wearable device and the tracking tag to obtain a second distance when the comparison result indicates that the first distance is greater than the first warning distance, recording a second comparison result of the second distance and a second warning distance in the wearable device or the tracking tag, and making at least one selected from a group consisting of the wearable device, the tracking tag and the valuable personal object generate an alarm message when the second comparison result indicates that the second distance is greater than the second warning distance (step c1).

Figure 4:
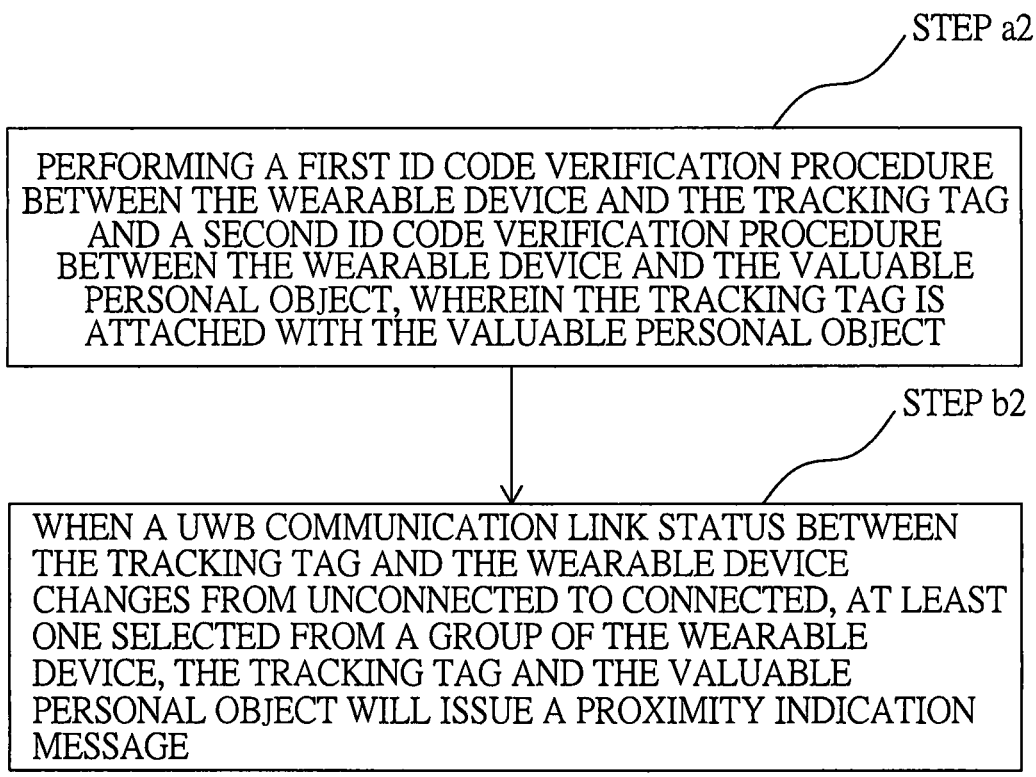
FIG. 4 illustrates a flow chart of another embodiment of the bidirectional tracking method of the present invention.

Please refer to FIG. 4, which illustrates a flow chart of another embodiment of the bidirectional tracking method of the present invention, where the bidirectional tracking method is applied between a wearable device and a valuable personal object attached with a tracking tag. As illustrated in FIG. 4, the bidirectional tracking method of the present invention includes the steps of: performing a first ID code verification procedure between the wearable device and the tracking tag and a second ID code verification procedure between the wearable device and the valuable personal object, wherein the tracking tag is attached with the valuable personal object (step a2); and when a UWB communication link status between the tracking tag and the wearable device changes from unconnected to connected, at least one selected from a group of the wearable device, the tracking tag and the valuable personal object will issue a proximity indication message (step b2).

As can be seen from the above description, the bidirectional tracking system and the bidirectional tracking method of the present invention does offer the advantages of effectively preventing a wearable device or a valuable personal object from being lost in an proactively preventive manner with low power consumption, and facilitating a user to find a wearable device or a valuable personal object efficiently.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:
1. A bidirectional tracking system comprising a wearable device and a tracking tag, the wearable device being for a user to wear or carry, the tracking tag being for attaching a personal object, and the bidirectional tracking system being characterized in that:
   the wearable device includes a first UWB module, a first Bluetooth module and a first alarm module;
   the tracking tag includes a second UWB module; and
   the personal object includes a tracking application program;

wherein at least one selected from a group consisting of the tracking tag and the personal object has a second Bluetooth module, and the second Bluetooth module is configured to perform a Bluetooth ranging procedure with the first Bluetooth module to obtain a first distance, when the first distance is greater than a first warning distance, the first UWB module performs a UWB ranging procedure with the second UWB module to obtain a second distance, and when the second distance is greater than a second warning distance, the first alarm module sends a warning message.

2. The bidirectional tracking system according to claim 1, wherein the Bluetooth ranging procedure obtains the first distance according to a Bluetooth signal reception strength, and the UWB ranging procedure obtains the second distance by using a TOF procedure.

3. The bidirectional tracking system according to claim 1, wherein the warning message includes one or more forms selected from a group consisting of a sound, a light signal, a number, a text and an image.

4. The bidirectional tracking system according to claim 1, wherein both the wearable device and the tracking tag have an ID code.

5. The bidirectional tracking system according to claim 1, wherein when a UWB communication link status between the first UWB module and the second UWB module changes from unconnected to connected, at least one selected from a group consisting of the first alarm module and the personal object will issue a proximity indication message.

6. The bidirectional tracking system according to claim 1, wherein the wearable device is a device selected from a group consisting of a smart watch, a smart bracelet, a smart necklace and a smart keychain.

7. The bidirectional tracking system according to claim 1, wherein the wearable device further comprises a first human-machine interface module.

8. The bidirectional tracking system according to claim 1 wherein the tracking tag further comprises a second human-machine interface module.

9. A bidirectional tracking method for use between a wearable device and a personal object incorporating a tracking tag, the bidirectional tracking method including the steps of:
performing a first ID code verification procedure between the wearable device and the tracking tag and a second ID code verification procedure between the wearable device and the personal object, wherein the tracking tag is attached with the personal object;
performing a Bluetooth ranging procedure between the wearable device and the personal object or between the wearable device and the tracking tag to obtain a first distance, and recording a first comparison result of the first distance and a first warning distance in the wearable device or the personal object; and
performing a UWB ranging procedure between the wearable device and the tracking tag to obtain a second distance when the comparison result indicates that the first distance is greater than the first warning distance, recording a second comparison result of the second distance and a second warning distance in the wearable device or the tracking tag, and making at least one selected from a group consisting of the wearable device, the tracking tag and the personal object generate an alarm message when the second comparison result indicates that the second distance is greater than the second warning distance.

* * * * *